United States Patent
Todd et al.

(10) Patent No.: US 10,838,946 B1
(45) Date of Patent: Nov. 17, 2020

(54) DATA QUALITY COMPUTATION FOR USE IN DATA SET VALUATION

(71) Applicant: EMC Corporation, Hopkinton, MA (US)

(72) Inventors: Stephen Todd, Shrewsbury, MA (US); Edward Patrick Walsh, Albany, NY (US)

(73) Assignee: EMC IP Holding Company LLC, Hopkinton, MA (US)

( * ) Notice: Subject to any disclaimer, the term of this patent is extended or adjusted under 35 U.S.C. 154(b) by 600 days.

(21) Appl. No.: 15/073,741

(22) Filed: Mar. 18, 2016

(51) Int. Cl.
G06F 16/23 (2019.01)
G06F 11/30 (2006.01)
G06Q 10/06 (2012.01)
G06Q 30/02 (2012.01)

(52) U.S. Cl.
CPC ...... *G06F 16/2365* (2019.01); *G06F 11/3079* (2013.01); *G06F 2201/80* (2013.01); *G06Q 10/0637* (2013.01); *G06Q 30/0201* (2013.01); *G06Q 30/0206* (2013.01); *G06Q 30/0283* (2013.01)

(58) Field of Classification Search
CPC ........ G06F 17/30303; G06F 17/30371; G06F 17/30554; G06F 17/30864; G06F 16/2365; G06F 11/3079; G06F 2201/80; G06Q 10/06395; G06Q 10/0637; G06Q 30/0206; G06Q 30/0283; G06Q 30/0201
USPC .......................................... 705/306; 714/746
See application file for complete search history.

(56) References Cited

U.S. PATENT DOCUMENTS

| | | | |
|---|---|---|---|
| 6,715,145 B1 | 3/2004 | Bowman-Amuah | |
| 6,957,227 B2* | 10/2005 | Fogel | G06Q 10/06 |
| 7,574,426 B1 | 8/2009 | Ortega | |
| 7,580,848 B2 | 8/2009 | Eder | |
| 7,752,195 B1 | 7/2010 | Hohwald et al. | |
| 7,890,451 B2 | 2/2011 | Cancel et al. | |
| 7,941,438 B2* | 5/2011 | Molina-Moreno | G06F 8/35 |
| | | | 707/756 |
| 7,970,729 B2 | 6/2011 | Cozzi | |
| 8,561,012 B1 | 10/2013 | Holler et al. | |
| 9,262,451 B1* | 2/2016 | Singh | G06F 17/30303 |
| 9,384,226 B1 | 7/2016 | Goel et al. | |
| 9,465,825 B2* | 10/2016 | Nelke | G06F 17/30303 |
| 9,606,828 B2 | 3/2017 | Ghosh et al. | |
| 9,851,997 B2 | 12/2017 | Gough et al. | |
| 2001/0042062 A1 | 11/2001 | Tenev et al. | |

(Continued)

OTHER PUBLICATIONS

Batini et al. "Methodologies for Data Quality Assessment and Improvement"; ACM Computing Surveys, vol. 41, No. 3, Article 16, Publication date: Jul. 2009 (Year: 2009).*

(Continued)

*Primary Examiner* — Dennis Truong
(74) *Attorney, Agent, or Firm* — Ryan, Mason & Lewis, LLP

(57) ABSTRACT

One or more operations (e.g., conditioning and/or curating) are performed on a data set to improve one or more quality attributes of the data set. Information about the one or more operations performed on the data set is stored as metadata and linked to the data set. One or more data quality metrics (e.g., data validity and/or timeliness) are computed from at least a portion of the stored metadata. The one or more computed data quality metrics are utilized to value the data set.

20 Claims, 3 Drawing Sheets

(56) References Cited

U.S. PATENT DOCUMENTS

| | | | |
|---|---|---|---|
| 2004/0122646 A1 | 6/2004 | Colossi et al. | |
| 2005/0182739 A1* | 8/2005 | Dasu | G06Q 10/00 706/47 |
| 2006/0247944 A1* | 11/2006 | Calusinski, Jr. | G06Q 40/00 705/1.1 |
| 2007/0005383 A1 | 1/2007 | Kasower | |
| 2008/0052330 A1* | 2/2008 | Beer | G06Q 10/06 |
| 2009/0018996 A1 | 1/2009 | Hunt et al. | |
| 2009/0282089 A1* | 11/2009 | Lakshmanachar | G06F 17/30067 |
| 2009/0327921 A1 | 12/2009 | Holm-Peterson et al. | |
| 2010/0005346 A1* | 1/2010 | Hamlescher | G06Q 10/06 714/57 |
| 2010/0049559 A1* | 2/2010 | Carbone | G06Q 10/06312 705/7.41 |
| 2010/0094685 A1 | 4/2010 | Young | |
| 2010/0153324 A1 | 6/2010 | Downs et al. | |
| 2011/0047056 A1* | 2/2011 | Overman | G06Q 40/06 705/35 |
| 2011/0055699 A1 | 3/2011 | Li et al. | |
| 2011/0078603 A1 | 3/2011 | Koomullil | |
| 2012/0084261 A1 | 4/2012 | Parab | |
| 2012/0116911 A1* | 5/2012 | Irving | G06Q 30/02 705/26.4 |
| 2012/0123994 A1* | 5/2012 | Lowry | G06Q 40/00 706/52 |
| 2012/0310684 A1 | 12/2012 | Carter | |
| 2012/0323843 A1 | 12/2012 | Bice et al. | |
| 2013/0036091 A1 | 2/2013 | Provenzano et al. | |
| 2013/0055042 A1* | 2/2013 | Al Za'noun | G06Q 10/06395 714/746 |
| 2013/0073594 A1* | 3/2013 | Jugulum | G06F 17/30303 707/802 |
| 2013/0110842 A1 | 5/2013 | Donneau-Golencer et al. | |
| 2013/0151423 A1* | 6/2013 | Schmidt | G06F 17/30303 705/306 |
| 2014/0052489 A1 | 2/2014 | Prieto | |
| 2014/0324856 A1 | 10/2014 | Lahiani et al. | |
| 2015/0120555 A1 | 4/2015 | Jung et al. | |
| 2015/0134591 A1* | 5/2015 | Staeben | G06F 17/30864 707/602 |
| 2015/0293974 A1 | 10/2015 | Loo | |
| 2016/0055184 A1 | 2/2016 | Fokoue-Nkoutche et al. | |
| 2016/0092557 A1* | 3/2016 | Stojanovic | G06Q 30/02 707/723 |
| 2016/0110819 A1 | 4/2016 | Abramowitz | |
| 2016/0196311 A1* | 7/2016 | Wang | G06F 19/70 707/722 |
| 2016/0224430 A1 | 8/2016 | Long et al. | |
| 2016/0358106 A1* | 12/2016 | Anderson | G05B 23/0254 |
| 2016/0371612 A1* | 12/2016 | Bagchi | G06Q 10/06395 |
| 2017/0060931 A1* | 3/2017 | Puri | G06T 11/206 |
| 2017/0236060 A1* | 8/2017 | Ignatyev | G06N 5/02 706/46 |
| 2017/0293655 A1 | 10/2017 | Ananthanarayanan et al. | |

OTHER PUBLICATIONS

Pipino et al. "Data Quality Assessment"; Communications of the ACM Apr. 2002/vol. 45, No. 4ve (Year: 2002).*

Kaomea; "Valuation of Data Quality: A Decision Analysis Approach" TDQM-94-09; Sep. 1994 (Year: 1994).*

U.S. Appl. No. 14/863,783, filed in the name of Stephen Todd et al. filed Sep. 24, 2015 and entitled "Unstructured Data Valuation."

U.S. Appl. No. 14/998,112, filed in the name of Stephen Todd et al. filed Dec. 24, 2015 and entitled "Data Valuation Based on Development and Deployment Velocity."

U.S. Appl. No. 14/973,096, filed in the name of Stephen Todd et al. filed Dec. 17, 2015 and entitled "Data Set Valuation for Service Providers."

U.S. Appl. No. 14/973,141, filed in the name of Stephen Todd et al. filed Dec. 17, 2015 and entitled "Automated Data Set Valuation and Protection."

U.S. Appl. No. 14/973,178, filed in the name of Stephen Todd filed Dec. 17, 2015 and entitled "Timeliness Metrics and Data Valuation in Distributed Storage Systems."

U.S. Appl. No. 15/072,557, filed in the name of Stephen Todd et al. filed Mar. 17, 2016 and entitled "Metadata-Based Data Valuation."

U.S. Appl. No. 13/923,791, filed in the name of Stephen Todd et al. filed Jun. 21, 2013 and entitled "Data Analytics Computing Resource Provisioning."

U.S. Appl. No. 14/744,886, filed in the name of Marina Zeldin et al. filed Jun. 19, 2015 and entitled "Infrastructure Trust Index."

Wikipedia, "Value Chain," https://en.wikipedia.org/w/index.php?title=Value_chain&printable=yes, Jun. 6, 2016, 7 pages.

Doug Laney, "The Economics of Information Assets," The Center for Infonomics, http://www.smarter-companies.com/group/icpractitioners/forum/topics/abstract-and-slides-for-today-s-session-on-infonomics-by-doug, Sep. 13, 2011, 22 pages.

Nicole Laskowski, "Six Ways to Measure the Value of Your Information Assets," Tech Target, http://searchcio.techtarget.com/feature/Six-ways-to-measure-the-value-of-your-information-assets?vgnextfmt=print, May 8, 2014, 3 pages.

R. Shumway et al., "White Paper: Infonomics in Practice: Realizing the True Value of Business Data," Cicero Group, http://cicerogroup.com/app/uploads/2015/09/Infonomics-in-Practice.pdf, 2015, 4 pages.

E. Kupiainen et al., "Why Are Industrial Agile Teams Using Metrics and How Do They Use Them?" Proceedings of the 5th International Workshop on Emerging Trends in Software Metrics, Jun. 2014, 7 pages.

D. Hartmann et al., "Appropriate Agile Measurement: Using Metrics and Diagnostics to Deliver Business Value," Proceedings of the Conference on AGILE, Jul. 2006, 6 pages.

T. Lehtonen et al., "Defining Metrics for Continuous Delivery and Deployment Pipeline," Proceedings of the 14th Symposium on Programming Languages and Software Tools, Oct. 2015, 16 pages.

* cited by examiner

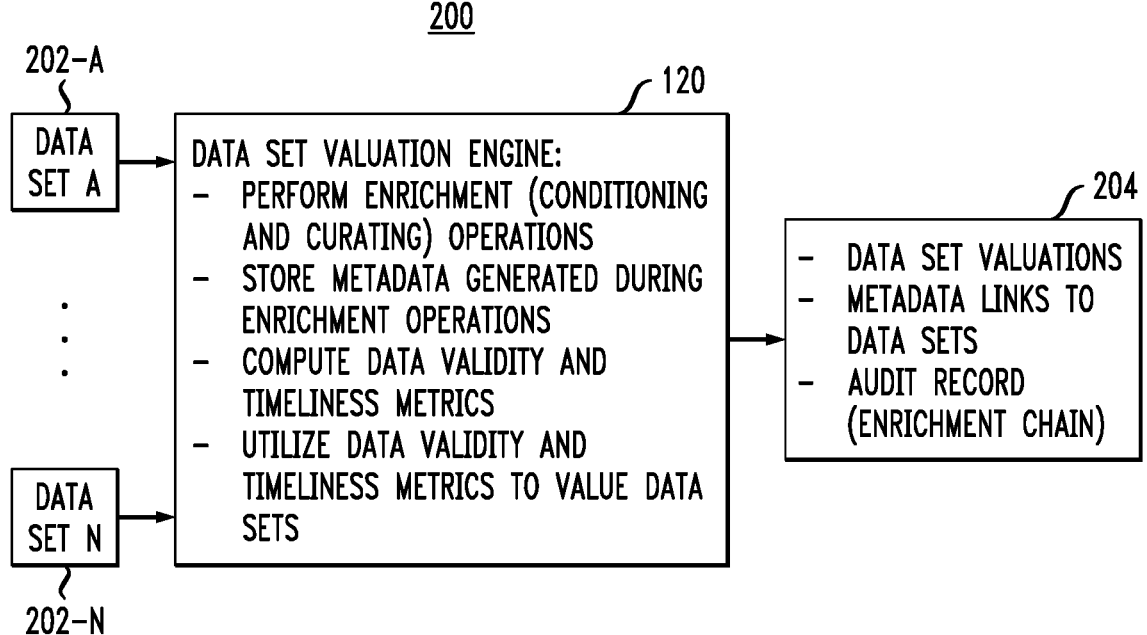
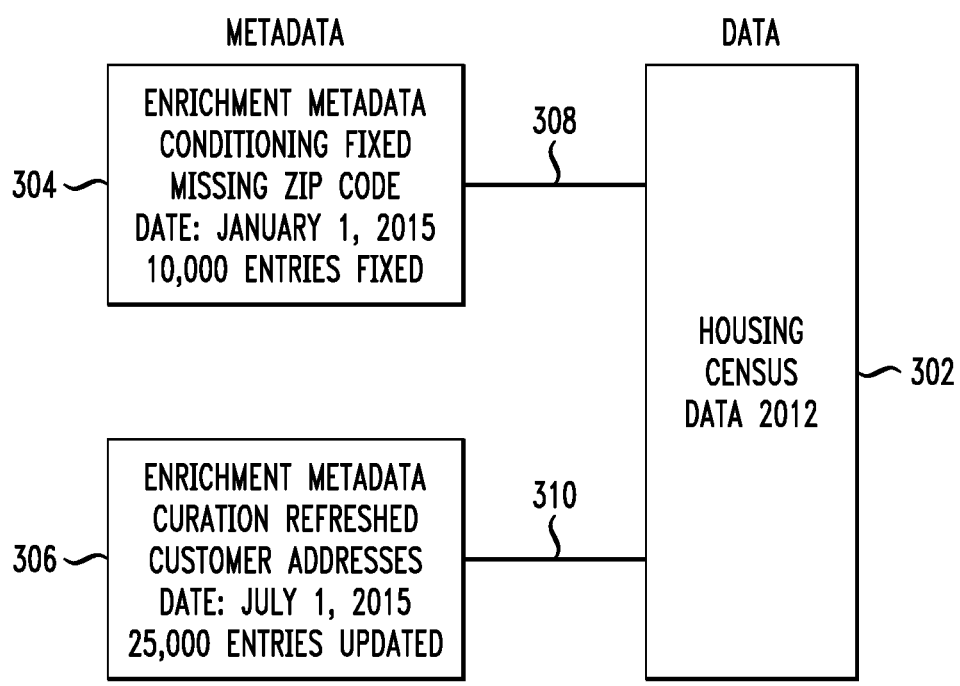

DATA QUALITY COMPUTATION FOR USE IN DATA SET VALUATION

FIELD

The field relates generally to data processing and, more particularly, to data set valuation.

BACKGROUND

As enterprises or other entities collect more and more electronic data during the course of their data processing operations, they are recognizing the importance of calculating the value of such data, i.e., performing data valuation. Calculating the value of data has a broad set of benefits.

By way of example, data valuation can be used to set a price for the sale of data. Further, data valuation can be used as part of an asset valuation exercise (e.g., a bankruptcy). Data valuation can also be used to prioritize the business value of different data sets and modify the information technology (IT) infrastructure investment based on that value (e.g., use disaster recovery for higher value data sets). Still further, data valuation can be used to charge users for access to the data and receive a fee in return.

SUMMARY

Embodiments of the invention provide data quality computation for use in valuation of data sets.

For example, in one embodiment, a method comprises the following steps. One or more operations are performed on a data set to improve one or more quality attributes of the data set. Information about the one or more operations performed on the data set is stored as metadata and linked to the data set. One or more data quality metrics are computed from at least a portion of the stored metadata. The one or more computed data quality metrics are utilized to value the data set.

Advantageously, in illustrative embodiments, the one or more operations may comprise a conditioning operation and/or a curating operation performed on the data set. Such operations enrich the data set. The one or more data quality metrics may comprise metrics indicative of data validity and/or data timeliness associated with the data set. These data quality metrics are then used to compute a data valuation for the data set. Thus, data sets may be valued using data quality attributes of the data sets rather than just on the semantic content attributes of the data sets.

These and other features and advantages of the invention will become more readily apparent from the accompanying drawings and the following detailed description.

BRIEF DESCRIPTION OF THE DRAWINGS

FIG. 2 illustrates a data set valuation engine and methodology according to an embodiment of the invention.

FIG. 3 illustrates an example of metadata linked to a data set following conditioning and curating operations according to an embodiment of the invention.

DETAILED DESCRIPTION

Figure 1:
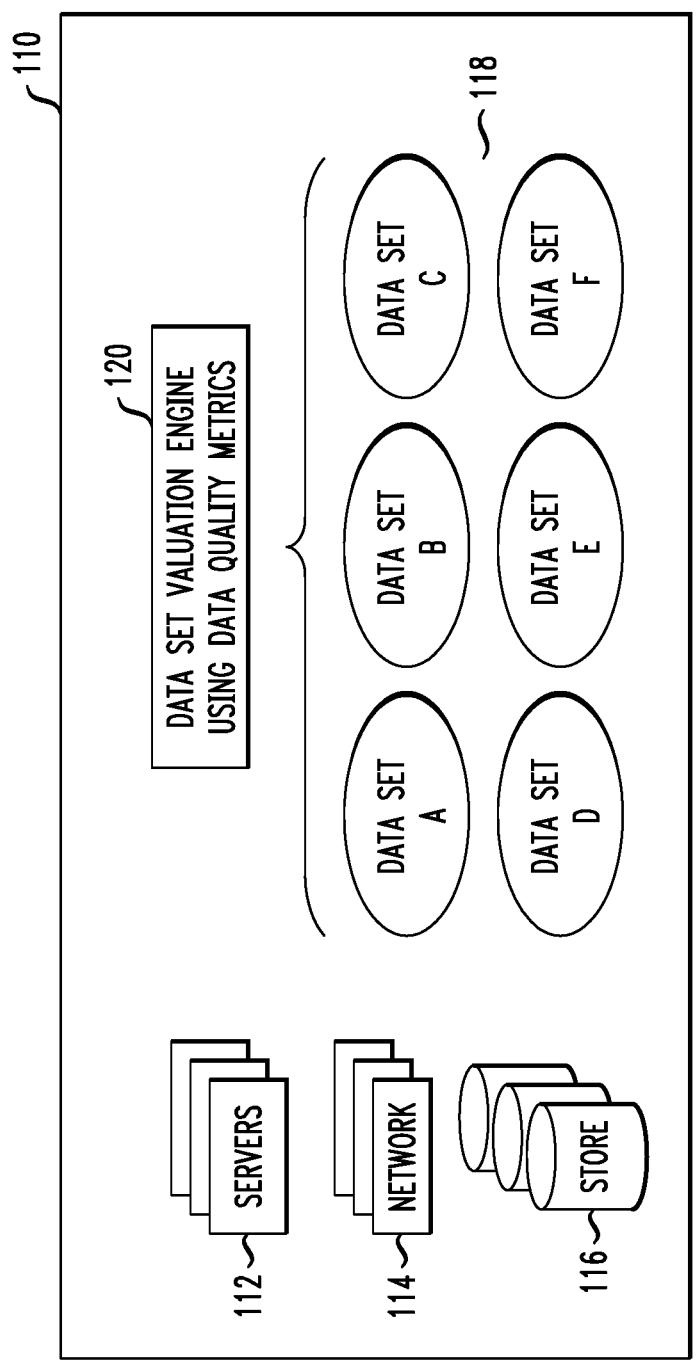
FIG. 1 illustrates a data set valuation engine environment according to an embodiment of the invention.

Illustrative embodiments may be described herein with reference to exemplary cloud infrastructure, data repositories, data centers, data processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "cloud infrastructure," "data repository," "data center," "data processing system," "computing system," "data storage system," "data lake," and the like as used herein are intended to be broadly construed so as to encompass, for example, private and/or public cloud computing or storage systems, as well as other types of systems comprising distributed virtual infrastructure. However, a given embodiment may more generally comprise any arrangement of one or more processing devices.

As used herein, the following terms and phrases have the following illustrative meanings:

"valuation" illustratively refers to a computation and/or estimation of something's worth or value; in this case, data valuation is a computation and/or estimation of the value of a data set for a given context;

"context" illustratively refers to surroundings, circumstances, environment, background, settings, characteristics, qualities, attributes, descriptions, and/or the like, that determine, specify, and/or clarify something; in this case, for example, context is used to determine a value of data;

"conditioning" illustratively refers to correcting errors (e.g., correcting inaccurate data items or adding omitted data items) in a data set; and "curating" illustratively refers to verifying the accuracy of one or more data items in the data set for the current time, and updating the one or more data items based on the verifying step. This may include refreshing at least one data item to a more up-to-date value.

As enterprises collect more and more data, they are recognizing the importance of calculating the data's business or economic value. In existing data valuation approaches, the value of data is often defined in terms of its semantic content (i.e., meaning of the content) and relevance of that semantic content to the given enterprise. However, a semantic content-based valuation approach alone, while relevant to the enterprise, is unaware of additional factors that impact the data value.

Illustrative embodiments of the invention realize that data valuation should take into account factors other than just semantic content-based factors, such other factors being data quality including data validity (accuracy) and data timeliness. For example, it is realized herein that a determination of what percentage of the data is deemed to be correct is an important factor in valuing the data. Another important factor realized by embodiments of the invention is timeliness, i.e., how often is new and/or updated data used to refresh the content. Accordingly, embodiments provide methodologies for calculating validity and timeliness associated with one or more data sets, and feed these factors into an overall data valuation algorithm.

However, when creating a method to calculate the quality of a data set, it is realized herein that a number of problems may arise.

For example, databases, files, objects, etc., lack any indication as to whether or not a data set has ever been conditioned. Thus, it is realized herein that even a simple Boolean value indicating that "yes this file has been conditioned" would be enough information to increase the validity metric of the data.

One option to calculate the validity of a file is to immediately begin a data quality determination of the file, either through manual inspection or by automated methods (e.g., scanning rows/columns of a database and comparing the data against a template describing valid cell values). The actual process of on-demand conditioning (temporarily) can affect its value, e.g., the timeliness of accessing the file is decreased.

Furthermore, enterprises that do invest in managing the condition and/or freshness of content must expend resources (i.e., people, tools, infrastructure, etc.) to do so. The level of investment is a statement as to the value of the content and this investment level is not accounted for as part of existing valuation approaches.

As content is curated and/or conditioned over time, the value evolves (often in a positive direction). Currently, there is no method to historically track the value evolution of content that has been modified to increase its value.

There is no existing method for asking what is the validity or timeliness characteristics for any data set, file, or object.

Still further, if the value of a data set begins to fluctuate based on changes in timeliness and/or validity, there is no existing method to audit these changes to confirm their accuracy and perhaps modify the valuation algorithms and approach.

Embodiments of the invention overcome these and other drawbacks. More particularly, embodiments track data conditioning and data curation events. The approach stores conditioning and curation events as metadata, and permanently links this metadata to the content. Leveraging this metadata to calculate validity and timeliness allows, for the first time, the ability to supply validity and timeliness metrics into an overall valuation equation to calculate value. The approach also introduces other important features and advantages. For example, tracking curation/conditioning activity creates a record of the resources that an enterprise used to perform these activities. This record allows the enterprise to perform other forms of valuation that are more business-oriented. In addition, embodiments of the invention provide a historical view into the evolution of data validity and timeliness over the lifetime of a data set and can be used for auditing purpose.

FIG. 1 illustrates a data set valuation engine environment according to an embodiment of the invention. As shown, computing environment 100 in FIG. 1 illustrates a cloud-based data center 110 comprising one or more compute elements (servers) 112, network elements 114 and/or storage elements 116. One or more elements of the data center access a plurality of data sets 118 (A through F). The data sets 118 could each have their own domain-specific data (e.g., customer data, housing data, etc.). In accordance with embodiments of the invention, a data set valuation engine 120 computes data valuation for one or more of the data sets using data quality metrics, as will be explained in detail herein.

FIG. 2 illustrates a data set valuation engine and methodology according to an embodiment of the invention. As shown in methodology 200, data sets 202-A through 202-N are input to data set valuation engine 120. Data set valuation engine 120 performs enrichment operations on one or more of the data sets. Enrichment operations include, but are not limited to, a data conditioning operation and a data curating operation. As mentioned above, conditioning is correcting errors in a data set, and curating is verifying the accuracy of one or more data items in the data set for the current time and updating the one or more data items based on the verifying step. This may include refreshing at least one data item to a more up-to-date value. Each of these operations improves the quality of a data set and thus increases the value of the data set to which they are applied.

The data set valuation engine 120 records and maintains metadata that describes the enrichment operations performed on each data set. Examples of such metadata will be given below. This metadata is stored and linked with the data set from which it was derived.

The data set valuation engine 120 computes data validity and timeliness metrics using this metadata. These metrics are then used to compute a data valuation for the one or more data sets. The engine 120 stores the following information 204 as a result of the above operations: data set valuations for the data sets, metadata links to the data sets, and audit records (e.g., enrichment chains) for the data sets.

FIG. 3 illustrates an example 300 of metadata linked to a data set following conditioning and curating operations according to an embodiment of the invention. Assume a data set 302 for which a data valuation will be performed comprises housing census data (e.g., name and home address of the people who participated in the census) for a previous year (e.g., as shown, 2012). It is realized herein that conditioning the data in data set 302, e.g., fixing erroneous zip codes, enriches the value of the data. Similarly, curating the data in data set 302 (e.g., verifying that a person still lives at the same address listed in the data set, and if not, updating the data set to reflect the new address) also enriches the data.

As such, metadata describing the enrichment events is created, as enrichment metadata 304 and 306, and is recorded by the data set valuation engine 120. Enrichment metadata 304 indicates that the conditioning operation performed on Jan. 1, 2015 fixed 10,000 erroneous zip codes in the 2012 housing census data set 302. Enrichment metadata 306 indicates that the curating operation performed on Jul. 1, 2015 updated (refreshed) 25,000 customer addresses in the 2012 housing census data set 302. It is to be appreciated that the conditioning and curating operations can be performed by the data set valuation engine 120, some other system or entity, or some combination thereof.

As further shown, enrichment metadata 304 (created by data conditioning operation) and enrichment metadata 306 (created by data curating operation) is linked to the data set 302 by links (e.g., pointers) 308 and 310, respectively. Thus, this metadata records the effort of the enterprise to improve data quality on a specific data set.

From this enrichment metadata, one or more data quality metrics can be computed. For example, since as part of the conditioning/curation operations, alterations were made to the original content, the amount (e.g., size or percentage) of change can be tracked and associated with the content. This statistic serve as a data validity (accuracy) metric. For example, if only one zip code out of 20,000 zip codes was found to be erroneous and subsequently fixed during the conditioning process, the metric would be a very low percentage because the quality of the data set was not substantially improved. However, that means that the original data set was very accurate, which would be important for a data valuation algorithm to consider. Alternatively, assume that only 50 percent of the zip codes were checked for errors for some reason, and the other 50 percent were not conditioned. Such data validity metrics would be useful for data valuation purposes.

Similarly, from the data curating metadata, data timeliness metrics are generated. For example, one metric that can be tracked is the percentage of refreshed addresses. Again, this could reflect what percentage of the entire set of addresses were verified or, if all addresses were verified, what percentage were actually updated with new address information. Another metric could reflect how much time has passed since the addresses were updated (i.e., a longer period of time between the original data and the refresh operation would likely make it more difficult to get current address information since people perhaps moved frequently and are thus more difficult to reach over an extended time). Such timeliness metrics would be useful for data valuation purposes.

Furthermore, it is realized herein that the process of curating or conditioning data comes along with a set of associated costs. For example, the salary of a data engineer for conditioning, or outsourcing curation to an outside firm, represent costs that a business must pay to improve data quality. These costs can have an impact on value. These costs attributable to data quality improvement can be considered data quality metrics as well.

These data quality metrics are stored with the enrichment data for use by the data set valuation engine 120 in computing a data valuation for the data set 302.

Illustrative embodiments utilize one or more data valuation algorithms for computing a data valuation for a given data set. By way of one non-limiting example, one or more of the data valuation models described in D. Laney, "The Economics of Information Assets," The Center for Infonomics, Smarter Companies presentation, September 2011, may be employed as a data valuation algorithm used by data set valuation engine 120. Such valuation models include a set of non-financial models and set of financial models. As shown, the non-financial models include: (i) an intrinsic value of information model, which represents a measure of a value of the correctness, completeness, and exclusivity (scarcity) of the data set; (ii) a business value of information model, which represents a measure of a value of the sufficiency and relevance of the data set for specific purposes; and (iii) a performance value of information model, which represents a measure of a value of how the data set affects key business drivers. The financial models include: (i) a cost value of information model, which represents a measure of a value of the cost of losing the data set; (ii) a market value of information model, which represents a measure of a value of the amount that could be obtained by selling or trading the data set; and (iii) an economic value of information model, which represents a measure of a value of how the data set contributes to a financial bottom line.

The various existing valuation models can be adapted in a straightforward manner to incorporate the data quality metrics described herein. By way of one example only, the above-mentioned cost value of information model takes into account a cost associated with initially capturing a data set. This model could be adapted to incorporate the data quality metric described above that quantifies a cost associated with data conditioning and data curating operations.

Furthermore, given the time-stamped nature of enrichment metadata entries, a date-ordered enrichment chain can be created and traversed. If the overall value of a data set is questioned, the timeliness or validity of that data can be audited by traversing the chain back to the data set in question.

Advantageously, the data valuation embodiments described herein promote the analysis of attached metadata as opposed to full-file search and analysis. This approach dramatically speeds up the calculation of timeliness and validity and exponentially increases valuation speeds.

We will now describe a use case based on the housing census data example described above in the context of FIG. 3 with one or more of the value index models mentioned above. Assume that the curation depicted in FIG. 3 has not yet been done to the 2012 census data. A data valuation algorithm that incorporates data timeliness as a metric may decide to deduct 0.25 from the value of the data set for each year that curation has not occurred. Therefore, the timeliness of the census data may be calculated at ([Original_Timeliness]−0.75). The lower timeliness score results in a reduction in the above-mentioned business value index.

Conversely, assume that the two enrichment events shown in FIG. 3 have occurred. Assume further that the conditioning (fixing of zip codes) occurred 6 months ago, and 10,000 entries were fixed. The system may perform any number of algorithms to calculate timeliness. For example:

- The system may choose to add 0.1 based on each conditioning event.
- The system may choose to look at the "size" of the enrichment event, measure it against the whole, and perform a ratio-based calculation for the conditioning event.
- The system may choose to explore the conditioning changes (based on the preservation of changes) and look specifically for changes related to "New Jersey" and then increase the value in a corresponding fashion. This may involve performing semantic-based valuation on the changes.
- The system may choose to look at the amount of resources consumed during the conditioning (e.g., one contractor spent one week cleaning the data at a cost of $2500, or an outside firm cost $10,000 to do more extensive conditioning) and increase the current cost for the calculation of the above-mentioned cost value index.

The curation changes noted in the enrichment metadata can be processed by similar methodologies to calculate validity. They can further increase the overall value by adding to the result of the conditioning valuation.

In the example above, consider that a corporation may wish to provide access to a data set based on its value. For example, the original 2012 housing census data, three years later, may be of interest to the general public. The corporation owning the data may provide the original copy of the data set for no charge. They now have a basis to advertise a "better" copy for a fee of $100, and they can articulate the value by expressing the increased validity and timeliness of the changes (e.g., how many records were cleaned up). If someone orders this copy, the corporation can then provide the "conditioned" version of the data. They also have a basis to advertise an "even better" copy of the data for a fee of $500 by advertising the curated data (2015 relevance) and using a similar algorithm to return this data set to the client.

Furthermore, in accordance with illustrative embodiments, the enriched metadata attached to a data set can be implemented using object-addressable techniques. As an enriched metadata entry is created, it receives an object identifier (ID). The metadata entry can point to the data source and also to other enriched metadata entries, which can then be linked for traversal. In addition, these objects can be content addressable (e.g., immutable) so that they cannot be altered. By performing this approach, the valuation algorithms can be more effectively audited (e.g., timestamps prove what timeliness or validity scores were used for a given data set).

Figure 4:
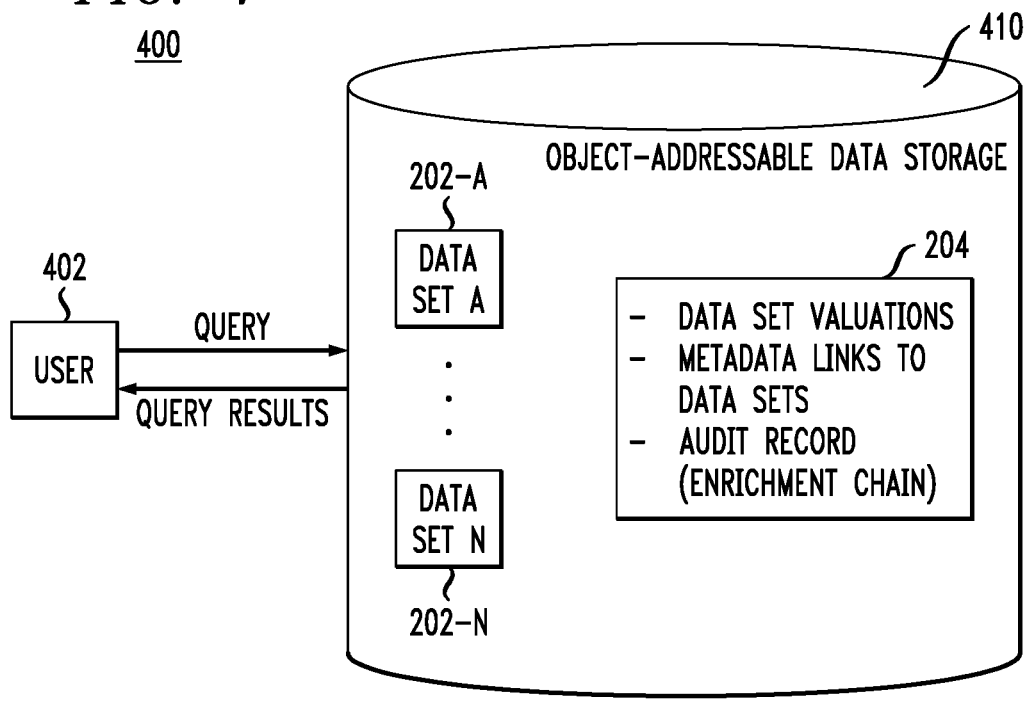
FIG. 4 illustrates a data set valuation object storage environment configured to respond to a query according to an embodiment of the invention.

FIG. 4 illustrates a data set valuation object storage environment configured to respond to a query according to an embodiment of the invention. As shown in computing environment 400, a user 402 (through a computing device) queries an object-addressable data storage system 410. Data storage system 410 contains data sets 202-A through 202-N (recall from FIG. 2), as well as the data set valuation engine 120 and information 204 that results from the enrichment and valuation operations: data set valuations for the data sets, metadata links to the data sets, and audit records (e.g., enrichment chains) for the data sets. Each data set, data set valuation, audit record (enrichment chain) is stored as a data object and thus is object-addressable. In further embodiments, each data object may have a unique content address that changes whenever the data object changes. Thus, in response to a user query, one or more such data objects are returned by the data storage system 410 as query results to the user 402.

Figure 5:
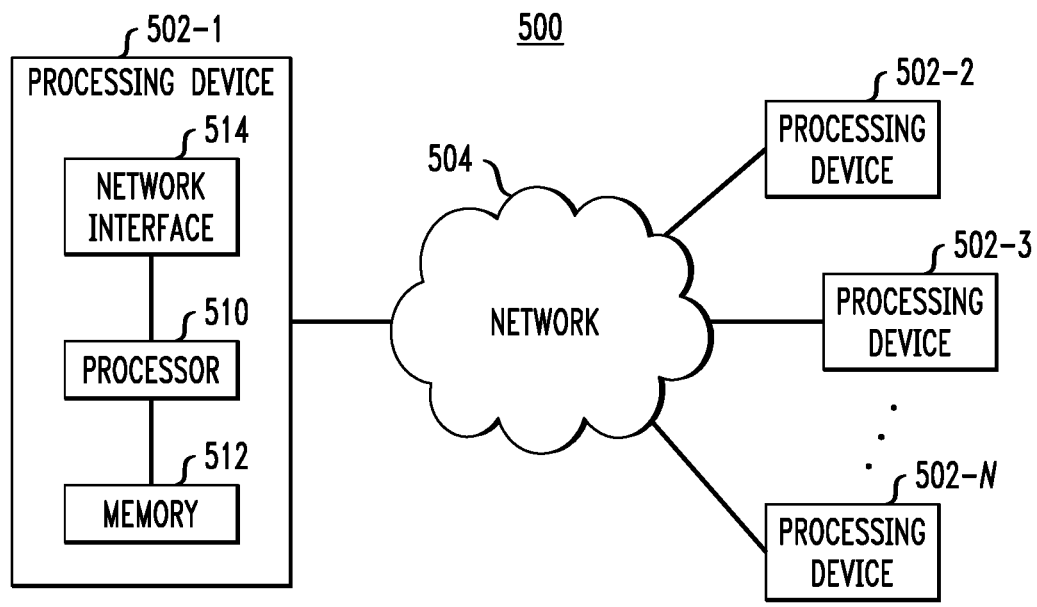
FIG. 5 illustrates a processing platform used to implement a computing infrastructure environment in which data set valuation techniques are implemented according to an embodiment of the invention.

As an example of a processing platform on which a data set valuation engine environment (e.g., 100 in FIGS. 1 and 400 in FIG. 4) according to illustrative embodiments can be implemented is processing platform 500 shown in FIG. 5. The processing platform 500 in this embodiment comprises a plurality of processing devices, denoted 502-1, 502-2, 502-3, . . . 502-N, which communicate with one another over a network 504. It is to be appreciated that the data valuation methodologies described herein may be executed in one such processing device 502, or executed in a distributed manner across two or more such processing devices 502. The cloud infrastructure environment may also be executed in a distributed manner across two or more such processing devices 502. The various functionalities described herein may be executed on the same processing devices, separate processing devices, or some combination of separate and the same (overlapping) processing devices. It is to be further appreciated that a server, a client device, a computing device or any other processing platform element may be viewed as an example of what is more generally referred to herein as a "processing device." As illustrated in FIG. 5, such a device generally comprises at least one processor and an associated memory, and implements one or more functional modules for instantiating and/or controlling features of systems and methodologies described herein. Multiple elements or modules may be implemented by a single processing device in a given embodiment.

The processing device 502-1 in the processing platform 500 comprises a processor 510 coupled to a memory 512. The processor 510 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 510. Memory 512 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 512 may comprise electronic memory such as random access memory (RAM), read-only memory (ROM) or other types of memory, in any combination. The one or more software programs when executed by a processing device such as the processing device 502-1 causes the device to perform functions associated with one or more of the components/steps of system/methodologies in FIGS. 1-4. One skilled in the art would be readily able to implement such software given the teachings provided herein. Other examples of processor-readable storage media embodying embodiments of the invention may include, for example, optical or magnetic disks.

Processing device 502-1 also includes network interface circuitry 514, which is used to interface the device with the network 504 and other system components. Such circuitry may comprise conventional transceivers of a type well known in the art.

The other processing devices 502 (502-2, 502-3, . . . 502-N) of the processing platform 500 are assumed to be configured in a manner similar to that shown for computing device 502-1 in the figure.

The processing platform 500 shown in FIG. 5 may comprise additional known components such as batch processing systems, parallel processing systems, physical machines, virtual machines, virtual switches, storage volumes, etc. Again, the particular processing platform shown in this figure is presented by way of example only, and the data valuation system and cloud infrastructure described herein may include additional or alternative processing platforms, as well as numerous distinct processing platforms in any combination.

Also, numerous other arrangements of servers, clients, computers, storage devices or other components are possible in processing platform 500. Such components can communicate with other elements of the processing platform 500 over any type of network, such as a wide area network (WAN), a local area network (LAN), a satellite network, a telephone or cable network, or various portions or combinations of these and other types of networks.

Furthermore, it is to be appreciated that the processing platform 500 of FIG. 5 can comprise virtual machines (VMs) implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 500 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the processing platform 500 in one or more embodiments of the invention is the VMware vSphere (VMware Inc. of Palo Alto, Calif.) which may have an associated virtual infrastructure management system such as the VMware vCenter. The underlying physical infrastructure may comprise one or more distributed processing platforms that include storage products such as VNX and Symmetrix VMAX (both available from EMC Corporation of Hopkinton, Mass.). A variety of other computing and storage products may be utilized to implement the one or more cloud services that provide the functionality and features described herein.

It was noted above that portions of the data valuation system and cloud environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
   performing enrichment operations on a data set to improve one or more quality attributes of the data set;
   storing, as metadata, information describing the enrichment operations performed on the data set, wherein the stored metadata is linked to the data set, the stored metadata comprising:
      at least a time-stamp representing a date or time of performance of the enrichment operations; and
      objects representing the information describing the enrichment operations, the objects having unique object identifiers respectively assigned thereto;
   computing one or more data quality metrics from at least a portion of the stored metadata, the one or more data quality metrics comprising metrics representative of data validity or timeliness associated with the data set;
   utilizing the one or more computed data quality metrics to value the data set associated with the enrichment operations;
   creating an audit record comprising an enrichment chain representing the improvements made to the data set by the enrichment operations in time-order based on the time stamps and indicating respective values of the data set resulting from the enrichment operations;
   traversing the enrichment chain in response to a query to determine the enrichment operations performed on the data set at a given time in the enrichment chain and the corresponding value of the data set at the given time;
   wherein objects of the stored metadata are each addressable by their unique object identifier and describe the enrichment operations performed on the data set at the given time;
   wherein, for a given data item in the data set, a unique data set identifier is assigned for each revision of the given data item; and
   wherein the steps are performed via at least one processor device.

2. The method of claim 1, wherein the enrichment operations on the data set to improve the one or more quality attributes of the data set comprise conditioning the data set.

3. The method of claim 2, wherein the step of conditioning the data set comprises correcting one or more errors in one or more data items in the data set.

4. The method of claim 1, wherein the enrichment operations on the data set to improve the one or more quality attributes of the data set comprise curating the data set.

5. The method of claim 4, wherein the step of curating the data set comprises:
   verifying the accuracy of one or more data items in the data set for a current time; and
   updating the one or more data items based on the verifying step.

6. The method of claim 1, wherein the one or more computed data quality metrics comprise a statistic representing the amount of the data set that is improved by the one or more operations.

7. The method of claim 1, wherein the one or more computed data quality metrics comprise a cost statistic associated with improving the data set by the one or more operations.

8. The method of claim 1, wherein the step of utilizing the one or more computed data quality metrics to value the data set further comprises generating a data valuation result based on the one or more data quality metrics.

9. The method of claim 1, wherein the step of utilizing the one or more computed data quality metrics to value the data set further comprises modifying a data valuation result based on the one or more data quality metrics.

10. The method of claim 1, further comprising providing a user interface for accessing the stored metadata and the one or more computed data quality metrics for the data set.

11. The method of claim 1 further including:
   performing one or more additional enrichment operations on the data set to create enriched metadata;
   storing the enriched metadata, the stored enriched metadata including at least a time-stamp representing a date or time of performance of the one or more additional enrichment operations and objects representing the information describing the one or more additional enrichment operations, the objects having unique object identifiers respectively assigned thereto; and
   linking the enriched stored metadata with the previously stored metadata and with the data set;
   wherein the enriched stored metadata with the previously stored metadata and with the data set form part of the enrichment chain.

12. An apparatus, comprising:
   a processor device operatively coupled to a memory and configured to:
   perform enrichment operations on a data set to improve one or more quality attributes of the data set;

store, as metadata, information describing the enrichment operations performed on the data set, wherein the stored metadata is linked to the data set, the stored metadata comprising:
    at least a time-stamp representing a date or time of performance of the enrichment operations; and
    objects representing the information describing the enrichment operations, the objects having unique object identifiers respectively assigned thereto;
compute one or more data quality metrics from at least a portion of the stored metadata, the one or more data quality metrics comprising metrics representative of data validity or timeliness associated with the data set;
utilize the one or more computed data quality metrics to value the data set associated with the enrichment operations;
create an audit record based comprising an enrichment chain representing the improvements made to the data set by the enrichment operations in time-order associated with the metadata and indicating respective values of the data set resulting from the enrichment operations; and
traverse the enrichment chain in response to a query to determine the enrichment operations performed on the data set, stored as metadata, at a given time in the enrichment chain and the corresponding value of the data set at the given time;
wherein objects of the stored metadata are each addressable by their unique object identifier and describe the enrichment operations performed on the data set at the given time; and
wherein, for a given data item in the data set, a unique data set identifier is assigned for each revision of the given data item.

13. The apparatus of claim 12, wherein the enrichment operations on the data set to improve the one or more quality attributes of the data set comprise conditioning the data set.

14. The apparatus of claim 12, wherein the enrichment operations on the data set to improve the one or more quality attributes of the data set comprise curating the data set.

15. The apparatus of claim 12 wherein the processor is further configured to:
    perform one or more additional enrichment operations on the data set to create enriched metadata;
    store the enriched metadata, the stored enriched metadata including at least a time-stamp representing a date or time of performance of the one or more additional enrichment operations and objects representing the information describing the one or more additional enrichment operations, the objects having unique object identifiers respectively assigned thereto; and
    link the enriched stored metadata with the previously stored metadata and with the data set;
    wherein the enriched stored metadata with the previously stored metadata and with the data set form part of the enrichment chain.

16. An article of manufacture comprising a processor-readable storage medium having encoded therein executable code of one or more software programs, wherein the one or more software programs when executed by one or more processing devices implement the steps of:
    performing enrichment operations on a data set to improve one or more quality attributes of the data set;
    storing, as metadata, information describing the enrichment operations performed on the data set, wherein the stored metadata is linked to the data set, the stored metadata comprising:
        at least a time-stamp representing a date or time of performance of the enrichment operations; and
        objects representing the information describing the enrichment operations, the objects having unique object identifiers respectively assigned thereto;
    computing one or more data quality metrics from at least a portion of the stored metadata, the one or more data quality metrics comprising metrics representative of data validity or timeliness associated with the data set;
    utilizing the one or more computed data quality metrics to value the data set associated with each enrichment process;
    creating an audit record comprising an enrichment chain representing the improvements made to the data set by the enrichment operations in time-order based on one or more time stamps associated with the enrichment operations, the audit record being based on at least a portion of the stored metadata;
    receiving a query; and
    traversing the enrichment chain in response to the query to determine a state of the data set at a given time in the enrichment chain;
    wherein objects of the stored metadata are each addressable by their unique object identifier and describe the enrichment operations performed on the data set at the given time; and
    wherein, for a given data item in the data set, a unique data set identifier is assigned for each revision of the given data item.

17. The article of manufacture of claim 16 wherein the one or more software programs when executed by one or more processing devices further implement the steps of:
    performing one or more additional enrichment operations on the data set to create enriched metadata;
    storing the enriched metadata, the stored enriched metadata including at least a time-stamp representing a date or time of performance of the one or more additional enrichment operations and objects representing the information describing the one or more additional enrichment operations, the objects having unique object identifiers respectively assigned thereto; and
    linking the enriched stored metadata with the previously stored metadata and with the data set;
    wherein the enriched stored metadata with the previously stored metadata and with the data set form part of the enrichment chain.

18. The article of manufacture of claim 16, wherein the enrichment operations on the data set to improve the one or more quality attributes of the data set comprise conditioning the data set.

19. The article of manufacture of claim 18, wherein the step of conditioning the data set comprises correcting one or more errors in one or more data items in the data set.

20. The article of manufacture of claim 16, wherein the enrichment operations on the data set to improve the one or more quality attributes of the data set comprise curating the data set.

* * * * *